United States Patent
Li et al.

(10) Patent No.: US 11,968,012 B2
(45) Date of Patent: Apr. 23, 2024

(54) INFORMATION TRANSMISSION METHOD AND TERMINAL

(71) Applicant: VIVO MOBILE COMMUNICATION CO., LTD., Guangdong (CN)

(72) Inventors: Na Li, Chang'an Dongguan (CN); Peng Sun, Chang'an Dongguan (CN); Yang Song, Chang'an Dongguan (CN)

(73) Assignee: Vivo Mobile Communication Co., Ltd., Guangdong (CN)

( * ) Notice: Subject to any disclaimer, the term of this patent is extended or adjusted under 35 U.S.C. 154(b) by 484 days.

(21) Appl. No.: 17/212,992

(22) Filed: Mar. 25, 2021

(65) Prior Publication Data

US 2021/0218451 A1 Jul. 15, 2021

Related U.S. Application Data

(63) Continuation of application No. PCT/CN2019/103018, filed on Aug. 28, 2019.

(30) Foreign Application Priority Data

Sep. 28, 2018 (CN) .......................... 201811143551.8

(51) Int. Cl.
*H04L 1/1867* (2023.01)
*H04B 7/06* (2006.01)
(Continued)

(52) U.S. Cl.
CPC ...... *H04B 7/0626* (2013.01); *H04W 72/0446* (2013.01); *H04W 72/21* (2023.01); *H04W 72/53* (2023.01); *H04W 72/542* (2023.01)

(58) Field of Classification Search
CPC ............ H04B 7/0626; H04W 72/0446; H04W 72/21; H04W 72/53; H04W 72/542; H04L 1/0026; H04L 1/1887
See application file for complete search history.

(56) References Cited

U.S. PATENT DOCUMENTS

| | | |
|---|---|---|
| 2013/0142134 A1 | 6/2013 | Zhu et al. |
| 2014/0078974 A1 | 3/2014 | Falahati et al. |

(Continued)

FOREIGN PATENT DOCUMENTS

| | | |
|---|---|---|
| CN | 105227286 A | 1/2016 |
| CN | 105723640 A | 6/2016 |

(Continued)

OTHER PUBLICATIONS

JP Office Action in Application No. 2021-0517654 dated Apr. 18, 2022.

(Continued)

*Primary Examiner* — Christopher M Crutchfield
*Assistant Examiner* — Abusayeed M Haque
(74) *Attorney, Agent, or Firm* — Price Heneveld LLP (57) ABSTRACT

An information transmission method and a terminal are disclosed. The method includes: when resource overlapping occurs between a first CSI report and a second CSI report, performing the following operations: if a physical channel corresponding to the first CSI report is a physical uplink control channel PUCCH, a physical channel corresponding to the second CSI report is a PUCCH, and a multi-CSI-physical uplink control channel-resource list is configured, transmitting the CSI reports with overlapping resources based on a resource in the multi-CSI-physical uplink control channel-resource list; and/or, if a physical channel corresponding to the first CSI report is a PUCCH, a physical channel corresponding to the second CSI report is a physical uplink shared channel PUSCH, and the PUCCH and the PUSCH are transmitted on different carriers, discarding the PUCCH and the CSI report carried on the PUCCH, and transmitting the PUSCH and the CSI report carried on the PUSCH.

9 Claims, 5 Drawing Sheets

(51) Int. Cl.
*H04L 5/00* (2006.01)
*H04W 72/0446* (2023.01)
*H04W 72/21* (2023.01)
*H04W 72/53* (2023.01)
*H04W 72/542* (2023.01)
*H04W 72/56* (2023.01)

(56) References Cited

U.S. PATENT DOCUMENTS

| | | | |
|---|---|---|---|
| 2016/0278077 A1 | 9/2016 | Song et al. | |
| 2017/0215202 A1 | 7/2017 | Yang et al. | |
| 2017/0289993 A1 | 10/2017 | Yerramalli et al. | |
| 2019/0081753 A1* | 3/2019 | Jung | H04W 24/10 |
| 2019/0081763 A1* | 3/2019 | Akkarakaran | H04L 1/1607 |
| 2019/0098580 A1* | 3/2019 | Babaei | H04W 72/56 |
| 2019/0215086 A1* | 7/2019 | Kwak | H04B 17/24 |
| 2019/0229780 A1* | 7/2019 | Kim | H04B 7/0643 |
| 2019/0254049 A1 | 8/2019 | Takeda et al. | |
| 2019/0356439 A1* | 11/2019 | Lee | H04L 5/0048 |
| 2019/0364438 A1* | 11/2019 | Yang | H04W 16/28 |
| 2020/0100239 A1* | 3/2020 | Jassal | H04L 5/0094 |
| 2021/0226683 A1 | 7/2021 | Yoshioka et al. | |

FOREIGN PATENT DOCUMENTS

| | | | |
|---|---|---|---|
| RU | 2599730 C2 | 10/2016 | |
| WO | 2011/038013 A2 | 3/2011 | |
| WO | 2012/022716 A1 | 2/2012 | |
| WO | 2012/128886 A1 | 9/2012 | |
| WO | WO-2013133653 A1 * | 9/2013 | H04B 7/024 |
| WO | 2017/136706 A1 | 8/2017 | |
| WO | 2017/196249 A1 | 11/2017 | |
| WO | 2017/196253 A1 | 11/2017 | |
| WO | 2018012549 A1 | 1/2018 | |
| WO | 2020031387 A1 | 2/2020 | |
| WO | WO-2020031387 A1 * | 2/2020 | H04B 7/0626 |

OTHER PUBLICATIONS

JP Office Action in Application No. 2021-517654 dated Nov. 14, 2022.
SG Office Action in Application No. 11202103176T dated Nov. 23, 2022.
"Remaining aspects of UCI multiplexing on PUSCH" 3GPP TSG RAN WG1 Meeting #92bis, CATT, R1-1807355, Apr. 16, 2018.
"Discussion on DCI related issues" 3GPP TSG RAN WG1 Meeting #93, Qualcomm Incorporated, R1-1807355, May 21, 2018.
RU Office Action in Application No. 2021110713/07 (023039) dated Sep. 14, 2021.
EP Search Report in Application No. 19865898.1 dated Oct. 11, 2021.
"Remaining issues on PUCCH" 3GPP TSG RAN WG1 Meeting #94bis, R1-1810370, vivo, Oct. 8, 2018.
"Remaining details for CSI reporting on PUCCH" 3GPP TSG RAN WG1 Meeting #92, R1-1802285, Nokia, Nokia Shanghai Bell, Feb. 26, 2018.
"Corrections to UCI feedback procedures" 3GPP TSG RAN WG1 Meeting #94, R1-1809713, CATT, Aug. 20, 2018.
CN Office Action in Application No. 201811143551.8 dated Oct. 27, 2020.
"Remaining issues on CSI reporting" 3GPP TSG RAN WG1 Meeting AH 1801, NTT Docomo, R1-1800659, Jan. 22, 2018.
"Remaining issues on CSI Reporting" 3GPP TSG RAN WG2 Meeting #94, NEC, R1-1808362, Aug. 20, 2018.
Written Opinion and International Search Report in Application No. PCT/CN2019/103018 dated Apr. 8, 2021.

* cited by examiner

INFORMATION TRANSMISSION METHOD AND TERMINAL

CROSS-REFERENCE TO RELATED APPLICATIONS

This application is a continuation application of International Application No. PCT/CN2019/103018 filed on Aug. 28, 2019, which claims priority to Chinese Patent Application No. 201811143551.8, filed in China on Sep. 28, 2018, which is incorporated herein by reference in its entirety.

TECHNICAL FIELD

This disclosure relates to the field of communications application, and in particular, to an information transmission method and a terminal.

BACKGROUND

Compared with previous mobile communications systems, future mobile communications systems need to adapt to more diverse scenarios and business requirements. Main scenarios of new radio (NR) include: enhanced mobile broadband (eMBB), massive machine type communication (mMTC), and ultra-reliable and low latency communications (URLLC). These scenarios have different requirements for the system including high reliability, low latency, large bandwidth, wide coverage, and the like.

A physical uplink control channel (PUCCH) for transmitting CSI is configured by a high layer and sent periodically or periodically after activation. Due to a flexible start symbol position and a flexible length, the PUCCH and a physical uplink shared channel (PUSCH) may overlap in time (a time-domain OFDM symbol occupied by the PUCCH partially or completely overlaps a time-domain OFDM symbol occupied by the PUSCH), that is, the two channels conflict in time.

Figure 1:
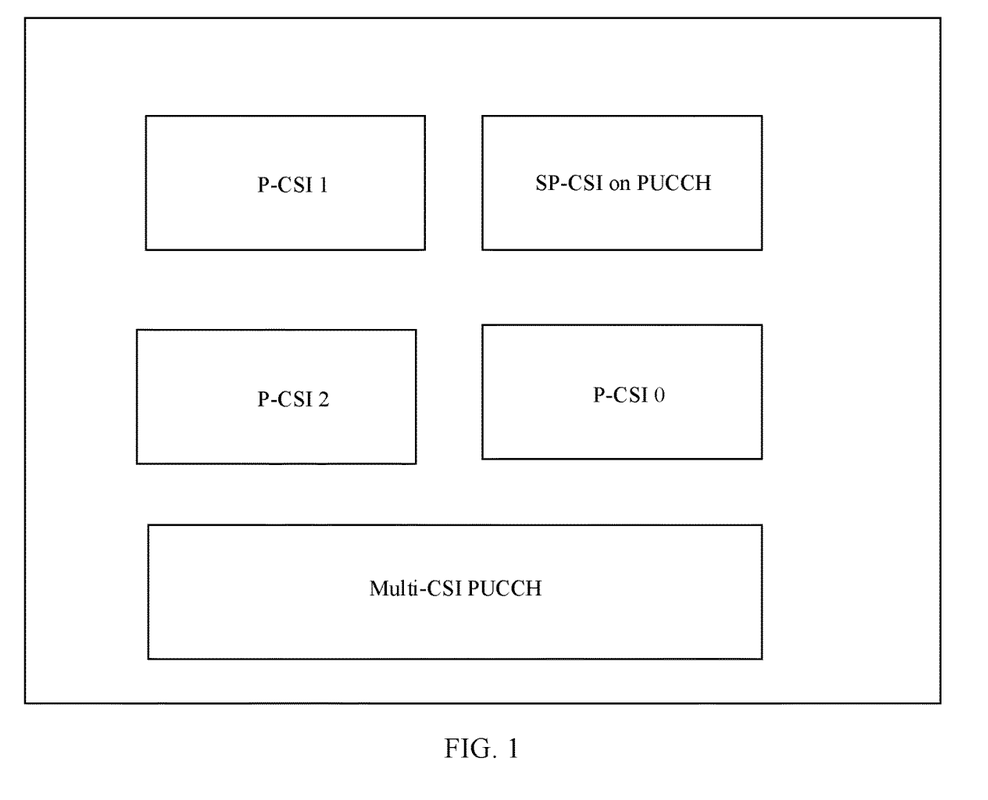
FIG. 1 is a schematic diagram of a first configuration of CSI resources.

To meet different needs, four different types of channel state information (CSI) reports are designed in the NR system: aperiodic CSI report (A-CSI); semi-persistent CSI report on PUSCH (SP-CSI on PUSCH); semi-persistent CSI report on PUCCH (SP-CSI on PUCCH); and periodic CSI report (P-CSI). When UE is configured with a multi-CSI-physical uplink control channel-resource list (multi-CSI-PUCCH-Resource List), in the related art, if there are two overlapping CSIs which have different resource report types y, the UE discards an overlapping CSI report whose priority is lower; and then, if there are overlapping CSI PUCCHs in one slot, the UE multiplexes all CSI reports on one PUCCH resource configured in the multi-CSI-PUCCH-Resource List for transmission. As shown in FIG. 1, in one slot, the UE has four CSIs transmitted on a PUCCH: P-CSI 0, P-CSI 1, P-CSI 2, and SP-CSI, for which a priority order is: SP-CSI>P-CSI 0>P-CSI 2. According to TS38.214, as SP-CSI PUCCH and P-CSI 0 conflict, the UE discards the lower-priority P-CSI 0, and then multiplexes P-CSI 1, P-CSI 2, and SP-CSI on the multi-CSI-PUCCH resource. In this scenario, P-CSI 0 has a higher priority than P-CSI 1 and P-CSI, but is discarded, while P-CSI 1 and P-CSI with lower priorities can be transmitted. Such a behavior of the UE is unreasonable.

In addition, when a PUCCH for transmitting CSI and a PUSCH for transmitting CSI overlap and are on different carriers, there is no clear method for how to transmit CSI reasonably.

SUMMARY

According to a first aspect, some embodiments of this disclosure provide an information transmission method, including:

when resource overlapping occurs between a first channel state information CSI report and a second CSI report, performing the following operations:

if a physical channel corresponding to the first CSI report is a physical uplink control channel PUCCH, a physical channel corresponding to the second CSI report is a PUCCH, and a multi-CSI-physical uplink control channel-resource list is configured, transmitting the CSI reports with overlapping resources based on a resource in the multi-CSI-physical uplink control channel-resource list; and/or if a physical channel corresponding to the first CSI report is a PUCCH, a physical channel corresponding to the second CSI report is a physical uplink shared channel PUSCH, and the PUCCH and the PUSCH are transmitted on different carriers, discarding the PUCCH and the CSI report carried on the PUCCH, and transmitting the PUSCH and the CSI report carried on the PUSCH.

According to a second aspect, some embodiments of this disclosure further provide a terminal, including:

a first transmission module, configured to, when resource overlapping occurs between a first channel state information CSI report and a second CSI report, if a physical channel corresponding to the first CSI report is a physical uplink control channel PUCCH, a physical channel corresponding to the second CSI report is a PUCCH, and a multi-CSI-physical uplink control channel-resource list is configured, transmit the CSI reports with overlapping resources based on a resource in the multi-CSI-physical uplink control channel-resource list; and/or if a physical channel corresponding to the first CSI report is a PUCCH, a physical channel corresponding to the second CSI report is a physical uplink shared channel PUSCH, and the PUCCH and the PUSCH are transmitted on different carriers, discard the PUCCH and the CSI report carried on the PUCCH, and transmit the PUSCH and the CSI report carried on the PUSCH.

According to a third aspect, some embodiments of this disclosure further provide a terminal, including a memory, a processor, and a computer program stored in the memory and capable of running on the processor, where when the computer program is executed by the processor, the steps of the foregoing information transmission method are implemented.

According to a fourth aspect, some embodiments of this disclosure further provide a computer-readable storage medium, where the computer-readable storage medium stores a computer program, and when the computer program is executed by a processor, the steps of the foregoing information transmission method are implemented.

BRIEF DESCRIPTION OF DRAWINGS

To describe the technical solutions in the embodiments of this disclosure more clearly, the following briefly describes the accompanying drawings required for describing some embodiments of this disclosure. Apparently, the accompanying drawings in the following description show merely some embodiments of this disclosure, and a person of ordinary skill in the art may still derive other drawings from these accompanying drawings without creative efforts.

DESCRIPTION OF EMBODIMENTS

The following describes example embodiments of this disclosure in more detail with reference to the accompanying drawings. Although the example embodiments of this disclosure are shown in the accompanying drawings, it should be understood that this disclosure may be implemented in various forms and should not be limited by the embodiments set forth herein. On the contrary, the embodiments are provided to enable a more thorough understanding of this disclosure and completely convey the scope of this disclosure to a person skilled in the art.

Terms "include", "comprise" and any other variants thereof in the specification and claims of the application are intended to cover the non-exclusive inclusion. For example, a process, method, system, product, or device that includes a series of steps or units is not necessarily limited to those expressly listed steps or units, but may include other steps or units not expressly listed or inherent to such process, method, system, product, or device. "And/or" in the specification and claims represents at least one of connected objects.

Examples provided in the following description are not intended to limit the scope, applicability, or configuration described in the claims. Functions and arrangements of discussed elements may be changed without departing from the spirit and scope of this disclosure. Various examples may be omitted or replaced properly, or various procedures or components may be added. For example, the described method may be performed in an order different from the described order, and steps may be added, omitted, or combined. In addition, features described with reference to some examples may be combined in other examples.

Figure 2:
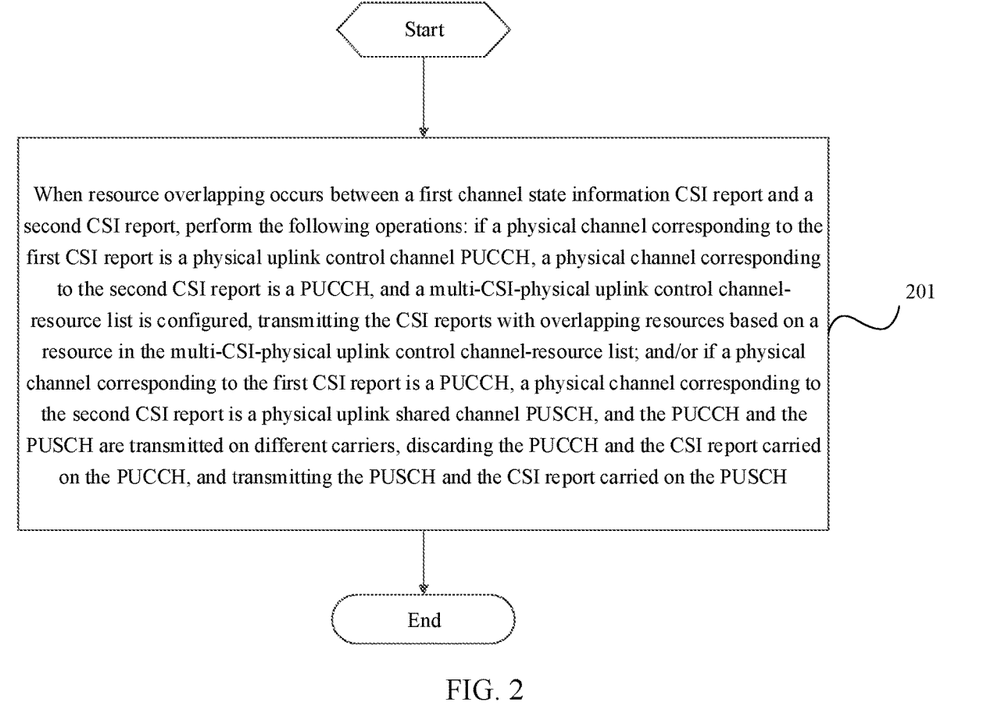
FIG. 2 is a schematic flowchart of an information transmission method according to some embodiments of this disclosure.

Some embodiments of this disclosure provide an information transmission method applied to a terminal and, as shown in FIG. 2, including the following steps.

Step 201: When resource overlapping occurs between a first channel state information CSI report and a second CSI report, perform the following operations: if a physical channel corresponding to the first CSI report is a physical uplink control channel PUCCH, a physical channel corresponding to the second CSI report is a PUCCH, and a multi-CSI-physical uplink control channel-resource list is configured, transmit the CSI reports with overlapping resources based on a resource in the multi-CSI-physical uplink control channel-resource list; and/or, if a physical channel corresponding to the first CSI report is a PUCCH, a physical channel corresponding to the second CSI report is a physical uplink shared channel PUSCH, and the PUCCH and the PUSCH are transmitted on different carriers, discard the PUCCH and the CSI report carried on the PUCCH, and transmit the PUSCH and the CSI report carried on the PUSCH.

For example, when a PUCCH for transmitting a CSI report on one carrier overlaps with a PUSCH resource for transmitting A-CSI on another carrier, the terminal discards the PUCCH and uplink control information UCI on the PUCCH, and only transmits the PUSCH and the A-CSI on the PUSCH. The PUCCH specifically only transmits P-CSI or SP-CSI, or in addition to transmitting P-CSI or SP-CSI, further transmits a scheduling request (SR).

Herein, resource overlapping may include overlapping in time domain. The foregoing resource overlapping may specifically mean that transmission resources of two CSI reports overlap in time domain, that is, the transmission resources corresponding to the two CSI reports have at least one symbol overlapping in time domain.

The CSI report in some embodiments of this disclosure includes at least one of an aperiodic CSI report, a semi-persistent CSI report on a PUSCH, a periodic CSI report, and a semi-persistent CSI report on a PUCCH.

The aperiodic CSI report and the semi-persistent CSI report on the PUSCH are both scheduled or triggered by DCI for transmission on a PUSCH, and the semi-persistent CSI report on the PUCCH and the periodic CSI report are triggered by media access control (MAC) or configured by radio resource control (RRC) for transmission on a PUCCH. Each CSI report corresponds to a CSI report priority, and different types of CSI reports correspond to different y values.

In addition, in some embodiments of this disclosure, a plurality of formats of PUCCH are supported. Among the formats, PUCCH formats that can be used to transmit a CSI report include a PUCCH format 2, a PUCCH format 3, and a PUCCH format 4. A length of the PUCCH format 2 may be one or two orthogonal frequency division multiplexing (OFDM) symbols. A start symbol in a slot may be any one of the $1^{st}$ to $14^{th}$ symbol positions, a length of the PUCCH format 3 or 4 may be 4 to 14 symbols, and a start symbol of the PUCCH in a slot may be any one of the $1^{st}$ to $10^{th}$ symbol positions. The physical uplink shared channel (PUSCH) may also support different symbol lengths, such as 1 to 14 OFDM symbols, and a start symbol in a slot may be any one of the $1^{st}$ to $14^{th}$ symbol positions.

That the physical channel corresponding to the first CSI report is a PUCCH refers to a PUCCH resource configured by a high layer to be associated with the first CSI report, which is not necessarily the PUCCH resource actually transmitting the CSI report.

Herein, the PUCCHs on which the CSI reports with overlapping resources are transmitted are PUCCHs in one PUCCH group, and the PUCCHs in the one PUCCH group can only be transmitted on one carrier, that is, transmitted on a primary cell (Pcell).

Herein, when resource overlapping occurs between the CSI reports transmitted on the PUCCHs, regardless of whether the conflicting CSI reports are of the same type or different types, the CSI reports with overlapping resources are multiplexed on one resource in the multi-CSI physical uplink control channel-resource list for transmission.

In the information transmission method according to some embodiments of this disclosure, when the physical channel corresponding to the first CSI report is a physical uplink control channel PUCCH, the physical channel corresponding to the second CSI report is a PUCCH, and the multi-CSI-physical uplink control channel-resource list is configured, the CSI reports with overlapping resources are transmitted based on the resource in the multi-CSI-physical uplink control channel-resource list, instead of being discarded based on priorities. This allows the terminal to transmit different types of CSI reports with overlapping, which is beneficial for UE to feed back more CSI reports, and avoids that higher-priority CSI reports are discarded while lower-priority CSI reports are transmitted. In addition, when the physical channel corresponding to the first CSI report is a PUCCH, the physical channel corresponding to the second CSI report is a physical uplink shared channel PUSCH, and the PUCCH and the PUSCH are transmitted on different carriers, the PUCCH and the CSI report carried on the PUCCH are discarded, and the PUSCH and the CSI report carried on the PUSCH are transmitted, guaranteeing a throughput of uplink transmission.

Further, in some embodiments of this disclosure, the information transmission method further includes:

when resource overlapping occurs between the first channel state information CSI report and the second CSI report, if the physical channel corresponding to the first CSI report is a PUCCH, the physical channel corresponding to the second CSI report is a PUCCH, and no multi-CSI-physical uplink control channel-resource list is configured, transmitting the CSI reports with overlapping resources based on priorities of the CSI reports.

Specifically, a CSI report with a higher priority is selected from the first CSI report and the second CSI report for transmission.

Herein, when the physical channels corresponding to the CSI reports with overlapping resources are PUCCHs, if no multi-CSI physical uplink control channel-resource list is configured, of the two CSI reports with overlapping resources, a CSI report with a higher priority is selected for transmission, and a CSI report with a lower priority is discarded.

Further, the transmitting the CSI reports with overlapping resources based on a resource in the multi-CSI-physical uplink control channel-resource list in step 201 includes:

multiplexing all CSI reports in a target slot on a target resource in the multi-CSI-physical uplink control channel-resource list for transmission, where the target slot is a slot in which the CSI reports with overlapping resources are transmitted.

The target resource herein is a resource in the multi-CSI physical uplink control channel-resource list.

All the CSI reports in the target slot herein include CSI reports with a resource conflict occurring in the target slot and CSI reports with no resource conflict. The CSI report may be P-CSI or SP-CSI on PUCCH.

Further, when a code rate corresponding to all the CSI reports in the target slot that are transmitted on the target resource is greater than a maximum code rate configured for the target resource, some of the CSI reports are discarded based on the priorities of the CSI reports, and non-discarded CSI reports in the target slot are multiplexed on the target resource for transmission.

For example, each CSI report includes two parts: a CSI part 1 and a CSI part 2, and a priority of the CSI part 2 is lower than a priority of the CSI part 1. When the code rate corresponding to all the CSI reports in the target slot is greater than the maximum code rate configured for the target resource, the CSI part 2 of the CSI report with the lower priority can be discarded first, the CSI part 2 of the CSI report with the higher priority is discarded, and then the CSI part 1 of the CSI report with the lower priority is discarded.

The following describes implementation processes of some embodiments of this disclosure with reference to specific embodiments.

Embodiment 1

Figure 3:
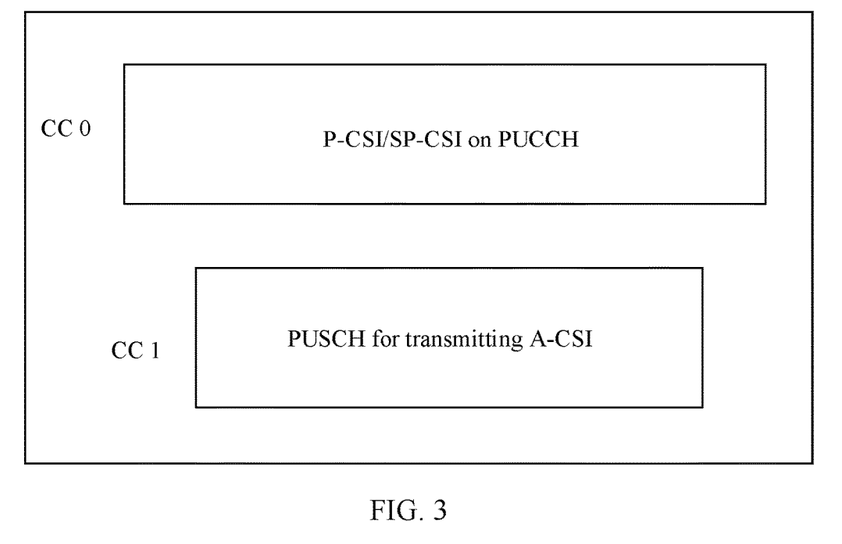
FIG. 3 is a schematic diagram of a second configuration of CSI resources.

As shown in FIG. 3, if a terminal is configured with a P-CSI or SP-CSI on PUCCH transmission in a primary cell (Pcell), and a PUSCH transmission in another secondary cell (Scell). The PUCCH is transmitted on a component carrier 0 (CC0), the PUSCH is transmitted on a CC1, and uplink grant (UL grant) corresponding to the PUSCH triggers an A-CSI report. As the PUCCH and PUSCH transmissions overlap in time domain, UE discards the PUCCH and the CSI report on the PUCCH, and only transmits the PUSCH and the A-CSI on the PUSCH.

Embodiment 2

As shown in FIG. 1, UE is configured with four CSI transmissions in one slot, which are specifically P-CSI 0, P-CSI 1, P-CSI 2, and SP-CSI on PUCCH, for which a priority order is: SP-CSI>P-CSI 0>P-CSI 1>P-CSI 2. Resources for P-CSI 1 and P-CSI 2 overlap in time domain, resources for P-CSI 0 and SP-CSI on PUCCH overlap in time domain, and no resources for P-CSI 1, P-CSI 2 and SP-CSI on PUCCH overlap. In addition, the UE is configured a multi-CSI-physical uplink control channel-resource list (multi-CSI-PUCCH-Resource List). The UE multiplexes all the CSI reports (including SP-CSI on PUCCH, P-CSI 0, P-CSI 1, and P-CSI 2) in the slot on a PUCCH resource configured in the multi-CSI physical uplink control channel-resource list. If a maximum code rate of the PUCCH resource is exceeded, the UE discards some CSI reports based on priorities.

Embodiment 3

Figure 4:
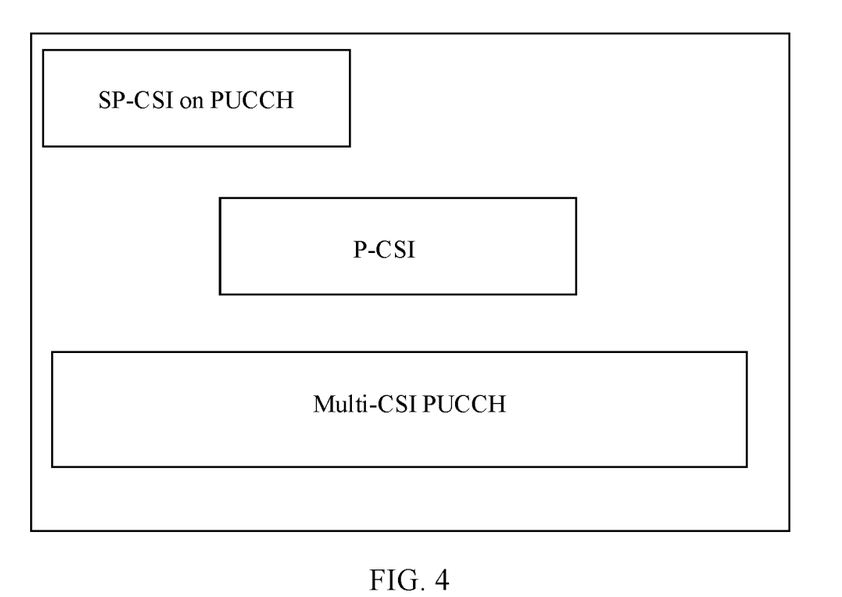
FIG. 4 is a schematic diagram of a third configuration of CSI resources.

As shown in FIG. 4, UE is configured with a P-CSI or SP-CSI on PUCCH transmission in one slot, for which a corresponding priority order is: SP-CSI>P-CSI, and resources for the P-CSI and the SP-CSI overlap in time domain. In addition, the UE is configured with a multi-CSI-PUCCH-Resource list. The UE multiplexes all the CSI reports (including SP-CSI and P-CSI) in the slot on a PUCCH resource configured in the multi-CSI-PUCCH-Resource list. If a maximum code rate of the PUCCH resource is exceeded, the UE discards some CSI reports based on priorities.

In the information transmission method according to some embodiments of this disclosure, when the physical channel corresponding to the first CSI report is a physical uplink control channel PUCCH, the physical channel corresponding to the second CSI report is a PUCCH, and the multi-CSI-physical uplink control channel-resource list is configured, the CSI reports with overlapping resources are transmitted based on the resource in the multi-CSI-physical uplink control channel-resource list, instead of being discarded based on priorities. This allows the terminal to transmit different types of CSI reports with overlapping, which is beneficial for UE to feed back more CSI reports, and avoids that higher-priority CSI reports are discarded while lower-priority CSI reports are transmitted. In addition, when the physical channel corresponding to the first CSI report is a PUCCH, the physical channel corresponding to the second CSI report is a physical uplink shared channel PUSCH, and the PUCCH and the PUSCH are transmitted on different carriers, the PUCCH and the CSI report carried on the PUCCH are discarded, and the PUSCH and the CSI report carried on the PUSCH are transmitted, guaranteeing a throughput of uplink transmission.

Figure 5:
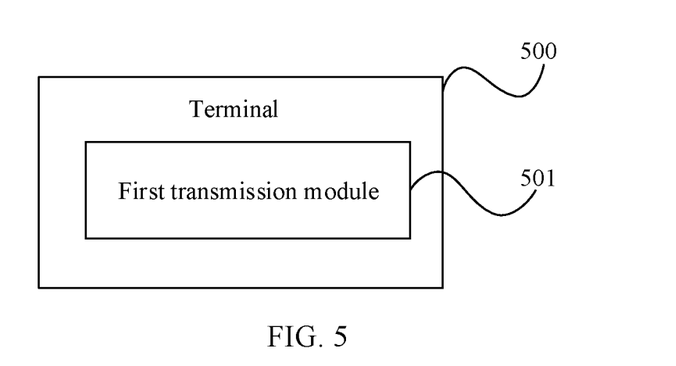
FIG. 5 is a schematic diagram 1 of modules of a terminal according to some embodiments of this disclosure.

FIG. 5 is a schematic diagram of modules of a terminal according to some embodiments of this disclosure. As shown in FIG. 5, an embodiment of this disclosure further provides a terminal 500, including:

a first transmission module 501, configured to, when resource overlapping occurs between a first channel state information CSI report and a second CSI report, if a physical channel corresponding to the first CSI report is a physical uplink control channel PUCCH, a physical channel corresponding to the second CSI report is a PUCCH, and a multi-CSI-physical uplink control channel-resource list is configured, transmit the CSI reports with overlapping resources based on a resource in the multi-CSI-physical uplink control channel-resource list; and/or if a physical channel corresponding to the first CSI report is a PUCCH, a physical channel corresponding to the second CSI report is a physical uplink shared channel PUSCH, and the PUCCH and the PUSCH are transmitted on different carriers, discard the PUCCH and the CSI report carried on the PUCCH, and transmit the PUSCH and the CSI report carried on the PUSCH.

It should be noted that a structural block diagram of the terminal shown in FIG. 5 is only a schematic diagram of the terminal in some embodiments of this disclosure. The terminal in some embodiments of this disclosure includes at least one of a first transmission module and a second transmission module.

Figure 6:
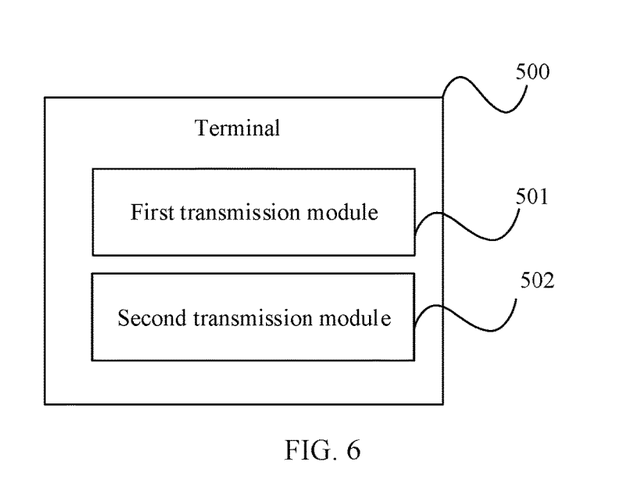
FIG. 6 is a schematic diagram 2 of modules of a terminal according to some embodiments of this disclosure.

Further, as shown in FIG. 6, a terminal in some embodiments of this disclosure further includes:

a second transmission module 502, configured to, when resource overlapping occurs between the first channel state information CSI report and the second CSI report, if the physical channel corresponding to the first CSI report is a PUCCH, the physical channel corresponding to the second CSI report is a PUCCH, and no multi-CSI-physical uplink control channel-resource list is configured, transmit the CSI reports with overlapping resources based on priorities of the CSI reports.

In the terminal in some embodiments of this disclosure, the second transmission module is configured to select to transmit a CSI report with a higher priority from the first CSI report and the second CSI report.

In the terminal in some embodiments of this disclosure, the first transmission module is configured to multiplex all CSI reports in a target slot on a target resource in the multi-CSI-physical uplink control channel-resource list for transmission, where the target slot is a slot in which the CSI reports with overlapping resources are transmitted.

In the terminal in some embodiments of this disclosure, the first transmission module is configured to: when a code rate corresponding to all the CSI reports in the target slot is greater than a maximum code rate configured for the target resource, discard some of the CSI reports based on the priorities of the CSI reports, and multiplex non-discarded CSI reports in the target slot on the target resource for transmission.

In the terminal in some embodiments of this disclosure, when the physical channel corresponding to the first CSI report is a physical uplink control channel PUCCH, the physical channel corresponding to the second CSI report is a PUCCH, and the multi-CSI-physical uplink control channel-resource list is configured, the CSI reports with overlapping resources are transmitted based on the resource in the multi-CSI-physical uplink control channel-resource list, instead of being discarded based on priorities. This allows the terminal to transmit different types of CSI reports with overlapping, which is beneficial for UE to feed back more CSI reports, and avoids that higher-priority CSI reports are discarded while lower-priority CSI reports are transmitted. In addition, when the physical channel corresponding to the first CSI report is a PUCCH, the physical channel corresponding to the second CSI report is a physical uplink shared channel PUSCH, and the PUCCH and the PUSCH are transmitted on different carriers, the PUCCH and the CSI report carried on the PUCCH are discarded, and the PUSCH and the CSI report carried on the PUSCH are transmitted, guaranteeing a throughput of uplink transmission.

An embodiment of this disclosure further provides a terminal, including a memory, a processor, and a computer program stored in the memory and capable of running on the processor. When the computer program is executed by the processor, each process of the foregoing information transmission method embodiment is implemented, with the same technical effects achieved. To avoid repetition, details are not described herein again.

An embodiment of this disclosure further provides a computer-readable storage medium, where the computer-readable storage medium stores a computer program. When the computer program is executed by a processor, each process of the foregoing information transmission method embodiment is implemented, with the same technical effects achieved. To avoid repetition, details are not described herein again. For example, the computer-readable storage medium is a read-only memory (ROM), a random access memory (RAM), a magnetic disk, or an optical disc.

Figure 7:
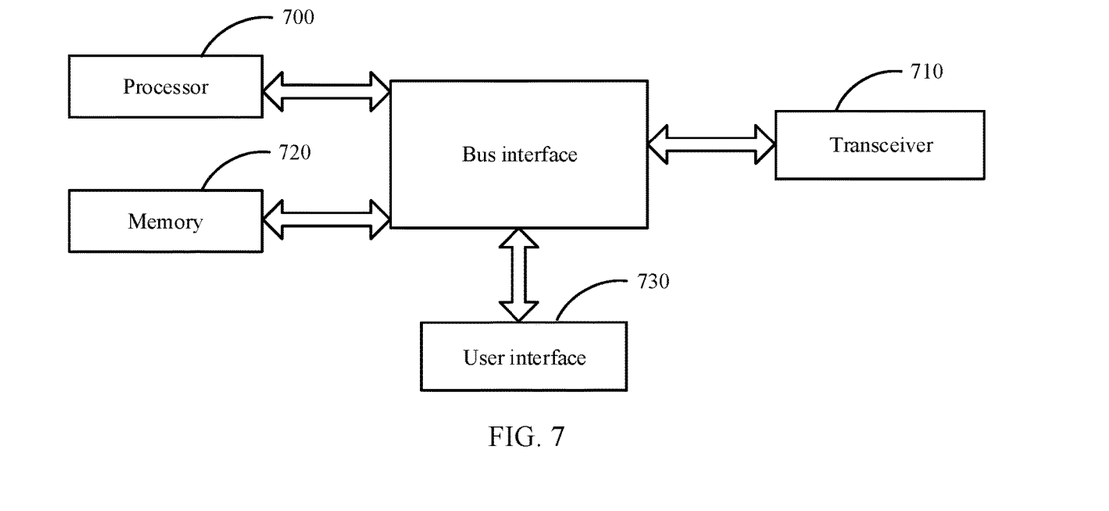
FIG. 7 is a first structural diagram of a terminal according to some embodiments of this disclosure.

For better achieving the foregoing objective, as shown in FIG. 7, an embodiment of this disclosure further provides a terminal, including a memory 720, a processor 700, a transceiver 710, a user interface 730, a bus interface, and a computer program stored in the memory 720 and capable of running on the processor 700, where the processor 700 is configured to read the program in the memory 720 to perform the following process:

when resource overlapping occurs between a first channel state information CSI report and a second CSI report, performing the following operations:

if a physical channel corresponding to the first CSI report is a physical uplink control channel PUCCH, a physical channel corresponding to the second CSI report is a PUCCH, and a multi-CSI-physical uplink control channel-resource list is configured, transmitting the CSI reports with overlapping resources based on a resource in the multi-CSI-physical uplink control channel-resource list; and/or if a physical channel corresponding to the first CSI report is a PUCCH, a physical channel corresponding to the second CSI report is a physical uplink shared channel PUSCH, and the PUCCH and the PUSCH are transmitted on different carriers, discarding the PUCCH and the CSI report carried on the PUCCH, and transmitting the PUSCH and the CSI report carried on the PUSCH.

In FIG. 7, a bus architecture may include any quantity of interconnected buses and bridges, and specifically connect together various circuits of one or more processors represented by the processor 700 and a memory represented by the memory 720. The bus architecture may further interconnect various other circuits such as a peripheral device, a voltage regulator, and a power management circuit. These are all well known in the art, and therefore are not further described in this specification. The bus interface provides interfaces. The transceiver 710 may be a plurality of components, that is, the transceiver 710 includes a transmitter and a receiver, and provides a unit for communicating with various other apparatuses on a transmission medium. For different user equipment, the user interface 730 may also be an interface capable of externally or internally connecting a required device, and the connected device includes but is not limited to a keypad, a display, a speaker, a microphone, a joystick, and the like.

The processor 700 is responsible for management of the bus architecture and general processing, and the memory 720 may store data for use by the processor 700 when the processor 700 performs an operation.

Optionally, by reading the program in the memory 720, the processor 700 is further configured to perform the following operations:

if the physical channel corresponding to the first CSI report is a PUCCH, the physical channel corresponding to the second CSI report is a PUCCH, and no multi-CSI-physical uplink control channel-resource list is configured, transmitting the CSI reports with overlapping resources based on priorities of the CSI reports.

Optionally, by reading the program in the memory 720, the processor 700 is further configured to perform the following operations:

when resource overlapping occurs between the first channel state information CSI report and the second CSI report, if the physical channel corresponding to the first CSI report is a PUCCH, the physical channel corresponding to the second CSI report is a PUCCH, and no multi-CSI-physical uplink control channel-resource list is configured, transmitting the CSI reports with overlapping resources based on priorities of the CSI reports.

Optionally, by reading the program in the memory 720, the processor 700 is further configured to perform the following operations:

multiplexing all CSI reports in a target slot on a target resource in the multi-CSI-physical uplink control channel-resource list for transmission, where the target slot is a slot in which the CSI reports with overlapping resources are transmitted.

Optionally, by reading the program in the memory 720, the processor 700 is further configured to perform the following operations:

when a code rate corresponding to all the CSI reports in the target slot is greater than a maximum code rate configured for the target resource, discarding some of the CSI reports based on the priorities of the CSI reports, and multiplexing non-discarded CSI reports in the target slot on the target resource for transmission.

In the terminal in some embodiments of this disclosure, when the physical channel corresponding to the first CSI report is a physical uplink control channel PUCCH, the physical channel corresponding to the second CSI report is a PUCCH, and the multi-CSI-physical uplink control channel-resource list is configured, the CSI reports with overlapping resources are transmitted based on the resource in the multi-CSI-physical uplink control channel-resource list, instead of being discarded based on priorities. This allows the terminal to transmit different types of CSI reports with overlapping, which is beneficial for UE to feed back more CSI reports, and avoids that higher-priority CSI reports are discarded while lower-priority CSI reports are transmitted. In addition, when the physical channel corresponding to the first CSI report is a PUCCH, the physical channel corresponding to the second CSI report is a physical uplink shared channel PUSCH, and the PUCCH and the PUSCH are transmitted on different carriers, the PUCCH and the CSI report carried on the PUCCH are discarded, and the PUSCH and the CSI report carried on the PUSCH are transmitted, guaranteeing a throughput of uplink transmission.

Figure 8:
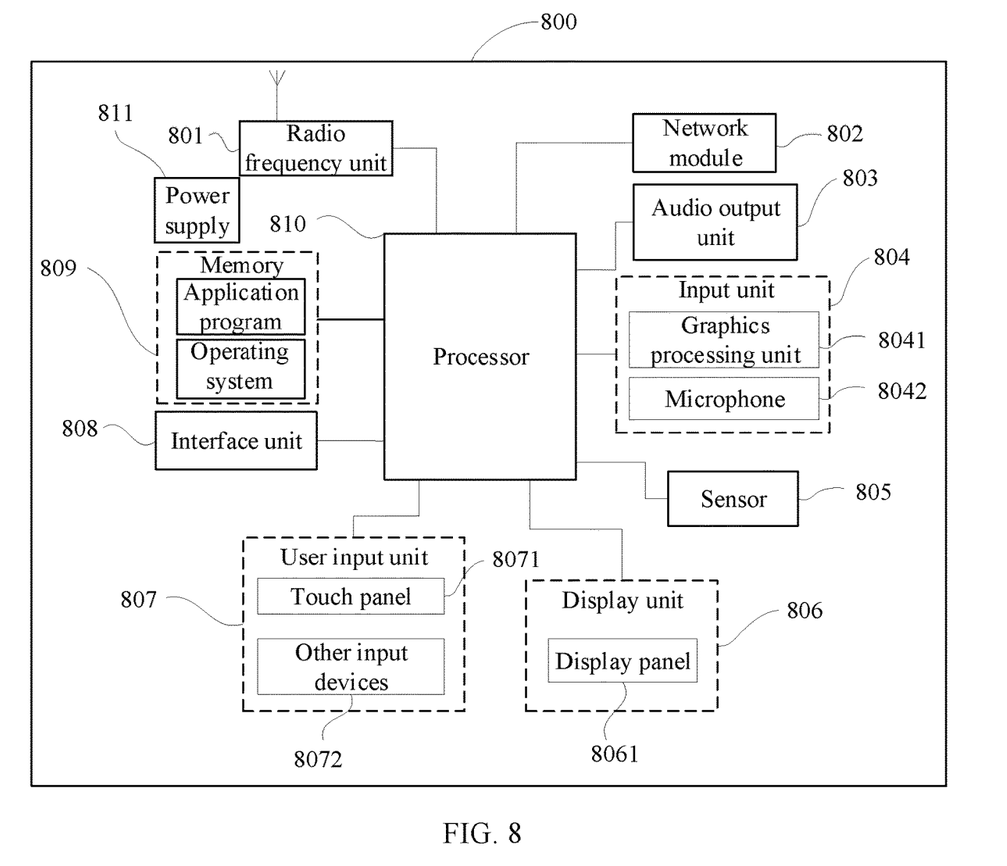
FIG. 8 is a second structural diagram of a terminal according to some embodiments of this disclosure.

FIG. 8 is a schematic diagram of a hardware structure of a terminal for implementing the embodiments of this disclosure. The terminal 800 includes but is not limited to components such as a radio frequency unit 801, a network module 802, an audio output unit 803, an input unit 804, a sensor 805, a display unit 806, a user input unit 807, an interface unit 808, a memory 809, a processor 810, and a power supply 811. A person skilled in the art may understand that the structure of the terminal shown in FIG. 8 does not constitute a limitation on the terminal. The terminal may include more or fewer components than those shown in the figure, or some components are combined, or component arrangements are different. In some embodiments of this disclosure, the terminal includes but is not limited to a mobile phone, a tablet computer, a laptop computer, a palmtop computer, an in-vehicle terminal, a wearable device, a pedometer, and the like.

The processor 810 is configured to, when resource overlapping occurs between a first channel state information CSI report and a second CSI report, perform the following operations:

if a physical channel corresponding to the first CSI report is a physical uplink control channel PUCCH, a physical channel corresponding to the second CSI report is a PUCCH, and a multi-CSI-physical uplink control channel-resource list is configured, transmitting the CSI reports with overlapping resources based on a resource in the multi-CSI-physical uplink control channel-resource list; and/or if a physical channel corresponding to the first CSI report is a PUCCH, a physical channel corresponding to the second CSI report is a physical uplink shared channel PUSCH, and the PUCCH and the PUSCH are transmitted on different carriers, discarding the PUCCH and the CSI report carried on the PUCCH, and transmitting the PUSCH and the CSI report carried on the PUSCH.

In the foregoing technical solution according to some embodiments of this disclosure, when the physical channel corresponding to the first CSI report is a physical uplink control channel PUCCH, the physical channel corresponding to the second CSI report is a PUCCH, and the multi-CSI-physical uplink control channel-resource list is configured, the CSI reports with overlapping resources are transmitted based on the resource in the multi-CSI-physical uplink control channel-resource list, instead of being discarded based on priorities. This allows the terminal to transmit different types of CSI reports with overlapping, which is beneficial for UE to feed back more CSI reports, and avoids that higher-priority CSI reports are discarded while lower-priority CSI reports are transmitted. In addition, when the physical channel corresponding to the first CSI report is a PUCCH, the physical channel corresponding to the second CSI report is a physical uplink shared channel PUSCH, and the PUCCH and the PUSCH are transmitted on different carriers, the PUCCH and the CSI report carried on the PUCCH are discarded, and the PUSCH and the CSI report carried on the PUSCH are transmitted, guaranteeing a throughput of uplink transmission.

It should be understood that, in some embodiments of this disclosure, the radio frequency unit 801 may be configured to send and receive signals in an information sending and receiving process or in a call process. Specifically, after receiving downlink data from a network device, the radio frequency unit 801 sends the downlink data to the processor 810 for processing, and in addition, sends uplink data to the network device. Generally, the radio frequency unit 801 includes but is not limited to an antenna, at least one amplifier, a transceiver, a coupler, a low noise amplifier, a duplexer, and the like. In addition, the radio frequency unit 801 may further communicate with a network and another device through a wireless communications system.

The terminal provides wireless broadband internet access for a user by using the network module 802, for example, helps the user send and receive e-mails, browse web pages, and access streaming media.

The audio output unit 803 may convert audio data received by the radio frequency unit 801 or the network module 802 or stored in the memory 809 into an audio signal and output the audio signal as a sound. In addition, the audio output unit 803 may further provide audio output (for example, a call signal reception tone or a message reception tone) that is related to a specific function performed by the terminal 800. The audio output unit 803 includes a speaker, a buzzer, a telephone receiver, and the like.

The input unit 804 is configured to receive an audio or video signal. The input unit 804 may include a graphics processing unit ( ) 8041 and a microphone 8042, and the graphics processing unit 8041 processes image data of a static picture or a video obtained by an image capture apparatus (for example, a camera) in an image capture mode or a video capture mode. A processed image frame may be displayed on the display unit 806. An image frame processed by the graphics processing unit 8041 may be stored in the memory 809 (or another storage medium) or sent by the radio frequency unit 801 or the network module 802. The microphone 8042 may receive a sound and can process the sound into audio data. The processed audio data may be converted, in a telephone call mode, into a format that can be sent to a mobile communications network device through the radio frequency unit 801, for outputting.

The terminal 800 further includes at least one sensor 805, for example, an optical sensor, a motion sensor, and another sensor. Specifically, the optical sensor includes an ambient light sensor and a proximity sensor. The ambient light sensor may adjust brightness of a display panel 8061 based on intensity of ambient light. When the terminal 800 moves near an ear, the proximity sensor may disable the display panel 8061 and/or backlight. As a motion sensor, an accelerometer sensor may detect for a value of an acceleration in various directions (there are usually three axes), may detect for a value and a direction of gravity when the terminal is static, and may be configured to recognize a posture of the terminal (for example, landscape/portrait mode switching, a related game, or magnetometer posture calibration), provide a function related to vibration recognition (for example, a pedometer or a keystroke), or the like. The sensor 805 may further include a fingerprint sensor, a pressure sensor, an iris sensor, a molecular sensor, a gyroscope, a barometer, a hygrometer, a thermometer, or an infrared sensor. Details are not described herein.

The display unit 806 is configured to display information input by the user or information provided for the user. The display unit 806 may include a display panel 8061, and the display panel 8061 may be configured in the form of a liquid crystal display (LCD), an organic light-emitting diode (OLED), or the like.

The user input unit 807 may be configured to receive input digit or character information, and generate a key signal input related to a user setting and function control of the terminal. Specifically, the user input unit 807 includes a touch panel 8071 and other input devices 8072. The touch panel 8071, also referred to as a touchscreen, may capture a touch operation performed by a user on or near the touch panel (for example, an operation performed by the user on the touch panel 8071 or near the touch panel 8071 by using any appropriate object or accessory such as a finger or a stylus). The touch panel 8071 may include two parts: a touch detection apparatus and a touch controller. The touch detection apparatus detects a touch direction of the user, detects a signal carried by a touch operation, and transmits the signal to the touch controller. The touch controller receives touch information from the touch detection apparatus, converts the touch information to point coordinates, and sends the point coordinates to the processor 810, and receives and executes a command sent by the processor 810. In addition, the touch panel 8071 may be implemented in a plurality of forms, for example, a resistive, capacitive, infrared, or surface acoustic wave touch panel. The user input unit 807 may further include other input devices 8072 in addition to the touch panel 8071. Specifically, the other input devices 8072 may include but are not limited to a physical keyboard, a function key (such as a volume control key or a power on/off key), a trackball, a mouse, a joystick, and the like. Details are not described herein.

Further, the touch panel 8071 may cover the display panel 8061. After detecting a touch operation on or near the touch panel 8071, the touch panel 8071 transmits the touch operation to the processor 810 to determine a type of a touch event. Then the processor 810 provides corresponding visual output on the display panel 8061 based on the type of the touch event. In FIG. 8, the touch panel 8071 and the display panel 8061 serve as two independent components to implement input and output functions of the terminal. However, in some embodiments, the touch panel 8071 and the display panel 8061 may be integrated to implement the input and output functions of the terminal. This is not specifically limited herein.

The interface unit 808 is an interface for connecting an external apparatus to the terminal 800. For example, the external apparatus may include a wired or wireless headphone port, an external power (or battery charger) port, a wired or wireless data port, a memory card port, a port for connecting an apparatus having a recognition module, an audio input/output (I/O) port, a video I/O port, an earphone port, and the like. The interface unit 808 may be configured to receive input (for example, data information and electric power) from the external apparatus, and transmit the received input to one or more components in the terminal 800; or may be configured to transmit data between the terminal 800 and the external apparatus.

The memory 809 may be configured to store a software program and various data. The memory 809 may mainly include a program storage area and a data storage area. The program storage area may store an operating system, an application program required for at least one function (such as a sound play function and an image play function), and the like. The data storage area may store data (such as audio data and a phone book) created based on use of a mobile phone, and the like. In addition, the memory 809 may include a high-speed random access memory, or may include a non-volatile memory, for example, at least one magnetic disk storage device, a flash memory device, or other volatile solid-state storage devices.

The processor 810 is a control center of the terminal, connects various parts of the entire terminal by using various interfaces and lines, and executes various functions and data processing of the terminal by running or executing a software program and/or a module stored in the memory 809 and invoking data stored in the memory 809, so as to perform overall monitoring on the terminal. The processor 810 may include one or more processing units. Optionally, the processor 810 may integrate an application processor and a modem processor. The application processor mainly processes an operating system, a user interface, an application program, and the like. The modem processor mainly processes wireless communication. It may be understood that the modem processor may alternatively not be integrated into the processor 810.

The terminal 800 may further include a power supply 811 (for example, a battery) that supplies power to each component. Optionally, the power supply 811 may be logically connected to the processor 810 by using a power management system, so as to implement functions such as charging management, discharging management, and power consumption management by using the power management system.

In addition, the terminal 800 includes some functional modules that are not shown. Details are not described herein.

It should be noted that the terms "comprise", "include", or any of their variants in this specification are intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the description of the foregoing implementations, a person skilled in the art can clearly understand that the method in the foregoing embodiments may be implemented by software on a necessary universal hardware platform or by hardware only. In most cases, the former is a more preferred implementation. Based on such an understanding, the technical solutions of this disclosure essentially or a part thereof that contributes to related technologies may be embodied in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the methods described in the embodiments of this disclosure.

The embodiments of this disclosure are described above with reference to the accompanying drawings, but this disclosure is not limited to the foregoing implementations. The foregoing implementations are only illustrative rather than restrictive. Inspired by this disclosure, a person of ordinary skill in the art can still derive many variations without departing from the essence of this disclosure and the protection scope of the claims. All these variations shall fall within the protection of this disclosure.

What is claimed is:

1. An information transmission method, comprising:
   when resource overlapping occurs between a first channel state information CSI report and a second CSI report, performing the following operations:
   if a physical channel corresponding to the first CSI report is a physical uplink control channel PUCCH, a physical channel corresponding to the second CSI report is a PUCCH, and a multi-CSI-physical uplink control channel-resource list is configured, transmitting the CSI reports with overlapping resources based on a resource in the multi-CSI-physical uplink control channel-resource list; or
   if a physical channel corresponding to the first CSI report is a PUCCH, a physical channel corresponding to the second CSI report is a physical uplink shared channel PUSCH, and the PUCCH and the PUSCH are transmitted on different carriers, discarding the PUCCH and the CSI report carried on the PUCCH, and transmitting the PUSCH and the CSI report carried on the PUSCH;
   wherein the transmitting the CSI reports with overlapping resources based on a resource in the multi-CSI-physical uplink control channel-resource list, comprises:
   multiplexing all CSI reports including the first CSI report and the second CSI report in a target slot on a target resource in the multi-CSI-physical uplink control channel-resource list for transmission, wherein the target slot is a slot in which the CSI reports with overlapping resources are transmitted;
   wherein the multiplexing all CSI reports including the first CSI report and the second CSI report in a target slot on a target resource in the multi-CSI-physical uplink control channel-resource list for transmission, comprises:
   when a code rate of all the CSI reports including the first CSI report and the second CSI report in the target slot is greater than a maximum code rate configured for the target resource, discarding some of the CSI reports based on the priorities of the CSI reports, and multiplexing non-discarded CSI reports in the target slot on the target resource for transmission;
   wherein each CSI report comprises two parts: a CSI part 1 and a CSI part 2, and a priority of the CSI part 2 is lower than a priority of the CSI part 1;
   when the code rate of all the CSI reports including the first CSI report and the second CSI report in the target slot is greater than the maximum code rate configured for the target resource, discarding some of the CSI reports based on the priorities of the CSI reports, comprises:
   according to priorities of all the CSI reports including the first CSI report and the second CSI report in the target slot, first discarding the CSI parts 2 of the CSI reports with lower priorities among all the CSI reports including the first CSI report and the second CSI report in the target slot, and then discarding the CSI parts 1 of the CSI reports with the lower priorities among all the CSI reports including the first CSI report and the second CSI report in the target slot.

2. The information transmission method according to claim 1, further comprising:
   when resource overlapping occurs between the first channel state information CSI report and the second CSI report, if the physical channel corresponding to the first CSI report is a PUCCH, the physical channel corresponding to the second CSI report is a PUCCH, and no multi-CSI-physical uplink control channel-resource list is configured, transmitting the CSI reports with overlapping resources based on priorities of the CSI reports.

3. The information transmission method according to claim 2, wherein the transmitting the CSI reports with overlapping resources based on priorities of the CSI reports comprises:
   selecting to transmit a CSI report with a higher priority from the first CSI report and the second CSI report.

4. A terminal, comprising a memory, a processor, and a computer program stored in the memory and capable of running on the processor, wherein the computer program is executed by the processor to perform steps of:
when resource overlapping occurs between a first channel state information CSI report and a second CSI report, performing the following operations:
if a physical channel corresponding to the first CSI report is a physical uplink control channel PUCCH, a physical channel corresponding to the second CSI report is a PUCCH, and a multi-CSI-physical uplink control channel-resource list is configured, transmitting the CSI reports with overlapping resources based on a resource in the multi-CSI-physical uplink control channel-resource list; or
if a physical channel corresponding to the first CSI report is a PUCCH, a physical channel corresponding to the second CSI report is a physical uplink shared channel PUSCH, and the PUCCH and the PUSCH are transmitted on different carriers, discarding the PUCCH and the CSI report carried on the PUCCH, and transmitting the PUSCH and the CSI report carried on the PUSCH;
wherein when transmitting the CSI reports with overlapping resources based on a resource in the multi-CSI-physical uplink control channel-resource list, the computer program is executed by the processor to perform steps of:
multiplexing all CSI reports including the first CSI report and the second CSI report in a target slot on a target resource in the multi-CSI-physical uplink control channel-resource list for transmission, wherein the target slot is a slot in which the CSI reports with overlapping resources are transmitted;
wherein when multiplexing all CSI reports including the first CSI report and the second CSI report in a target slot on a target resource in the multi-CSI-physical uplink control channel-resource list for transmission, the computer program is executed by the processor to perform steps of:
when a code rate of all the CSI reports including the first CSI report and the second CSI report in the target slot is greater than a maximum code rate configured for the target resource, discarding some of the CSI reports based on the priorities of the CSI reports, and multiplexing non-discarded CSI reports in the target slot on the target resource for transmission;
wherein each CSI report comprises two parts: a CSI part 1 and a CSI part 2, and a priority of the CSI part 2 is lower than a priority of the CSI part 1;
when discarding some of the CSI reports based on the priorities of the CSI reports when the code rate of all the CSI reports including the first CSI report and the second CSI report in the target slot is greater than the maximum code rate configured for the target resource, the computer program is executed by the processor to perform steps of:
according to priorities of all the CSI reports including the first CSI report and the second CSI report in the target slot, first discarding the CSI parts 2 of the CSI reports with lower priorities among all the CSI reports including the first CSI report and the second CSI report in the target slot, and then discarding the CSI parts 1 of the CSI reports with the lower priorities among all the CSI reports including the first CSI report and the second CSI report in the target slot.

5. The terminal according to claim 4, wherein the computer program is executed by the processor to perform:
when resource overlapping occurs between the first channel state information CSI report and the second CSI report, if the physical channel corresponding to the first CSI report is a PUCCH, the physical channel corresponding to the second CSI report is a PUCCH, and no multi-CSI-physical uplink control channel-resource list is configured, transmitting the CSI reports with overlapping resources based on priorities of the CSI reports.

6. The terminal according to claim 5, wherein the computer program is executed by the processor to perform:
selecting to transmit a CSI report with a higher priority from the first CSI report and the second CSI report.

7. A computer-readable storage medium, wherein the computer-readable storage medium stores a computer program, and the computer program is executed by a processor to perform steps of:
when resource overlapping occurs between a first channel state information CSI report and a second CSI report, performing the following operations:
if a physical channel corresponding to the first CSI report is a physical uplink control channel PUCCH, a physical channel corresponding to the second CSI report is a PUCCH, and a multi-CSI-physical uplink control channel-resource list is configured, transmitting the CSI reports with overlapping resources based on a resource in the multi-CSI-physical uplink control channel-resource list; or
if a physical channel corresponding to the first CSI report is a PUCCH, a physical channel corresponding to the second CSI report is a physical uplink shared channel PUSCH, and the PUCCH and the PUSCH are transmitted on different carriers, discarding the PUCCH and the CSI report carried on the PUCCH, and transmitting the PUSCH and the CSI report carried on the PUSCH;
wherein when transmitting the CSI reports with overlapping resources based on a resource in the multi-CSI-physical uplink control channel-resource list, the computer program is executed by the processor to perform steps of:
multiplexing all CSI reports including the first CSI report and the second CSI report in a target slot on a target resource in the multi-CSI-physical uplink control channel-resource list for transmission, wherein the target slot is a slot in which the CSI reports with overlapping resources are transmitted;
wherein when multiplexing all CSI reports including the first CSI report and the second CSI report in a target slot on a target resource in the multi-CSI-physical uplink control channel-resource list for transmission, the computer program is executed by the processor to perform steps of:
when a code rate of all the CSI reports including the first CSI report and the second CSI report in the target slot is greater than a maximum code rate configured for the target resource, discarding some of the CSI reports based on the priorities of the CSI reports, and multiplexing non-discarded CSI reports in the target slot on the target resource for transmission;
wherein each CSI report comprises two parts: a CSI part 1 and a CSI part 2, and a priority of the CSI part 2 is lower than a priority of the CSI part 1;
when discarding some of the CSI reports based on the priorities of the CSI reports when the code rate of all the CSI reports including the first CSI report and the second CSI report in the target slot is greater than the maximum code rate configured for the target resource, the computer program is executed by the processor to perform steps of:

according to priorities of all the CSI reports including the first CSI report and the second CSI report in the target slot, first discarding the CSI parts 2 of the CSI reports with lower priorities among all the CSI reports including the first CSI report and the second CSI report in the target slot, and then discarding the CSI parts 1 of the CSI reports with the lower priorities among all the CSI reports including the first CSI report and the second CSI report in the target slot.

8. The computer-readable storage medium according to claim 7, wherein the computer program is executed by the processor to perform:
when resource overlapping occurs between the first channel state information CSI report and the second CSI report, if the physical channel corresponding to the first CSI report is a PUCCH, the physical channel corresponding to the second CSI report is a PUCCH, and no multi-CSI-physical uplink control channel-resource list is configured, transmitting the CSI reports with overlapping resources based on priorities of the CSI reports.

9. The computer-readable storage medium according to claim 8, wherein the computer program is executed by the processor to perform:
selecting to transmit a CSI report with a higher priority from the first CSI report and the second CSI report.

\* \* \* \* \*